United States Patent [19]

Rempel et al.

[11] Patent Number: 4,881,855

[45] Date of Patent: Nov. 21, 1989

[54] VACUUM PARTICULATE TRANSFER APPARATUS

[75] Inventors: Frank Rempel; Clarence M. Zacharias; Linden G. Maxwell, all of Swift Current, Canada

[73] Assignee: Rem Manufacturing Ltd., Swift Current, Canada

[21] Appl. No.: 230,333

[22] Filed: Aug. 9, 1988

[51] Int. Cl.$^4$ .............................................. B65G 53/48
[52] U.S. Cl. .................................... 406/53; 406/171; 198/671; 414/526
[58] Field of Search ....................... 406/53, 41, 42, 168, 406/169, 171, 172, 151, 155, 157, 159; 414/526, 326, 520, 218, 398; 198/671, 548

[56] References Cited

U.S. PATENT DOCUMENTS

| | | | |
|---|---|---|---|
| 1,385,870 | 7/1921 | Gieseler | 406/171 X |
| 2,199,894 | 5/1940 | Phelps | 406/53 |
| 2,296,014 | 9/1942 | Benzel, Sr. et al. | 414/526 X |
| 3,097,939 | 7/1963 | Schneider et al. | 406/53 X |
| 3,232,419 | 2/1966 | Rasmussen | 198/671 X |
| 3,349,930 | 10/1967 | Welborn | 406/53 X |
| 3,424,501 | 1/1969 | Young | 406/171 X |
| 3,490,813 | 1/1970 | Hallstrom | 406/168 X |
| 4,344,723 | 8/1982 | Ellingson | 406/168 X |
| 4,512,687 | 4/1985 | Enns | 406/53 X |
| 4,662,800 | 5/1987 | Anderson et al. | 406/53 |

FOREIGN PATENT DOCUMENTS 2089754 6/1982 United Kingdom .................. 406/53

Primary Examiner—Sherman D. Basinger
Assistant Examiner—James M. Kannofsky
Attorney, Agent, or Firm—Hovey, Williams, Timmons & Collins

[57] ABSTRACT

An intake hose on one sidewall of the machine communicates with a source of negative pressure to create a powerful suction air stream that draws particulate materials through the hose and propels them into a chamber where they separate from the air stream and charge by their own momentum directly into a discharge auger assembly on the opposite sidewall of the machine. The auger assembly joins with the sidewall of the machine at an upwardly and outwardly inclined attitude for elevating the materials into a suitable receiving truck or trailer alongside of the machine, and a lower longitudinal portion of the assembly which adjoins the sidewall is open along its length to facilitate the unimpeded reception and entry of particulate materials from the hose directly into the auger. The auger assembly includes a tubular housing surrounding an internal, longitudinally extending auger, and a pair of successive outlet ports in the housing adjacent the upper and outer end of the assembly are controlled by independently functioning, spring-biased, sealing doors that assist in providing an airlock in the assembly during operation to prevent the admittance of power-robbing ambient air to the separating chamber via the auger assembly.

17 Claims, 3 Drawing Sheets

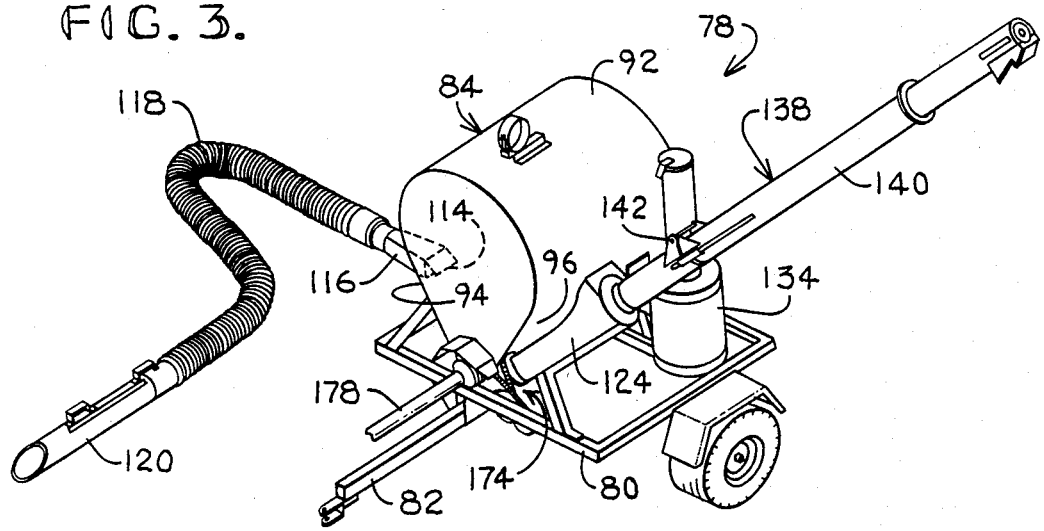
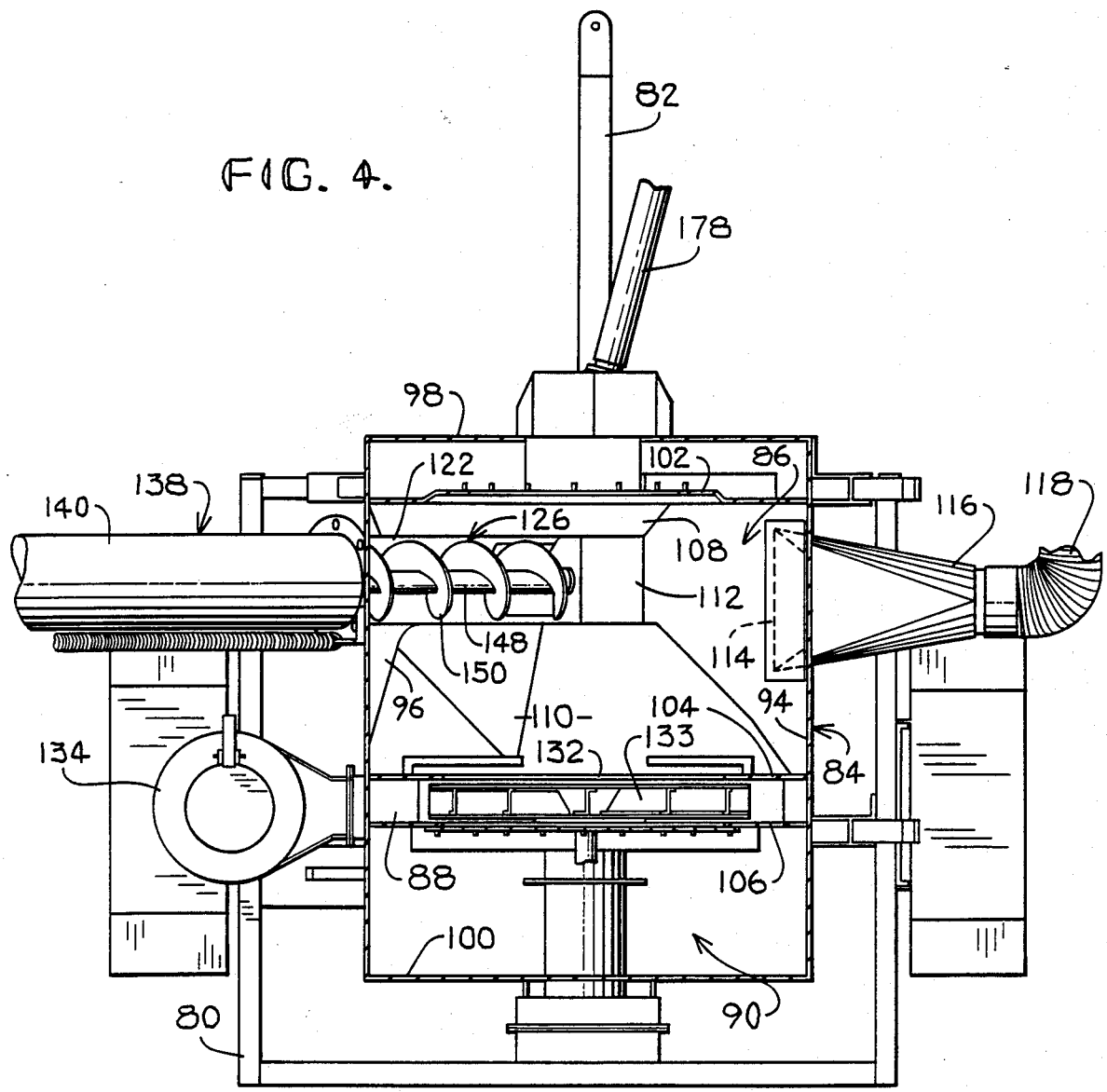

VACUUM PARTICULATE TRANSFER APPARATUS

FIELD OF THE INVENTION

This invention relates to the field of bulk transfer machines for granular materials and, more particularly, to a highly efficient portable unit useable by farmers and the like which combines the best attributes of vacuum pickup and auger discharge technologies.

BACKGROUND OF THE INVENTION

The assignee of the present invention is also the assignee of U.S. Pat. 4,662,800 relating to a grain and fertilizer collector machine which has been commercialized for several years by the assignee herein and which represents the underlying technology of which the present invention is a significant improvement. While the machine disclosed and claimed in the '800 patent has been a meaningful advance in the art of handling granular materials in bulk form, it has also been subject to certain shortcomings which have been overcome in the present invention.

For example, the machine of the '800 Patent, after receiving materials internally through a vacuum-generated pickup air stream, mechanically transfers such particles to a single location at the rear of the machine via a full-length unloading auger extending front-to-rear along the bottom of the machine. At that location the materials may be dumped into another, elevating auger not a part of the machine itself, which may be pulled into place by the farmer to then transfer the discharing materials upwardly and outwardly into a trailer or truck moved into position adjacent the machine.

In other words, two separate mechanical augers are utilized pursuant to the concepts of the '800 Patent, i.e., one to consolidate the collected materials at a single point of discharge, and another to then carry the consolidated materials away from the machine and into the ultimate collecting container or receptacle. This concept, although quite satisfactory from a functional standpoint, is relatively inefficient, compared to the present invention, and does not provide an acceptably high operating capacity given the amount of operating horsepower available.

SUMMARY OF THE PRESENT INVENTION

Accordingly, one important object of the present invention is to provide a loader of the general class and type disclosed in the '800 Patent for use by farmers and the like for loading grain and other particulate materials from bins and other storage structures into trucks, wagons, or other receptacles yet which a dramatic improvement over the prior patented machine in terms of operating efficiency and capacity.

To this end, the present invention contemplates continuing to utilize a combination of vacuum pickup and mechanical auger unloading technologies but in a way that makes better use of such apparatus, eliminates parts, simplifies construction and increases reliability. Instead of a consolidating auger along the bottom length of the machine, and then a separate elevating auger to direct the consolidated materials into the adjacent receptacle, the present invention contemplates a single elevating auger built into and forming a part of the machine itself which is strategically positioned at a special sidewall location of the machine so as to be directly charged with high velocity, incoming particulate materials entering the machine from the suction pickup hose. Thus, instead of collecting and piling up in the bottom of the machine to be then augered to a single discharge point at the rear, the particulate materials in accordance with the present invention are essentially propelled in a continuous, super-charging flow directly from the pickup hose into the awaiting open side of the discharging auger on the opposite side of the machine. Air is separated from the particulate materials within the interior of the machine in much the same manner as in the earlier '800 Patent, but the inertia of the high velocity incoming particles is undiminished to the maximum extent possible as the particles charge across the machine and into the discharging auger.

A double door air lock system at the upper and outer discharge end of the auger assembly reduces the unintentional ingress of ambient air through the discharge auger by opening the auger assembly only to the extent actually necessary to accommodate the volume of grain or other particulte material actually issuing from the auger assembly. Each of the successively disposed doors is independently openable under the force of the discharging materials so that, while the first door in the series might need to be opened to permit discharge, the other may remain closed, depending upon the volume of flow involved, so as to minimize the opportunity for ambient air to enter the auger assembly and thus reduce the suction power of the pickup hose.

BRIEF DESCRIPTION OF THE DRAWINGS

FIG. 3 is a top, left, front perspective view of a bulk loader embodying the principles of the present invention;

FIG. 4 is an enlarged, fragmentary top plan view of the machine of FIG. 3 with the top portion of the main body of the machine removed and interior mechanisms only partially shown to reveal interior details of the body;

DETAILED DESCRIPTION OF THE INVENTION

Figure 1:
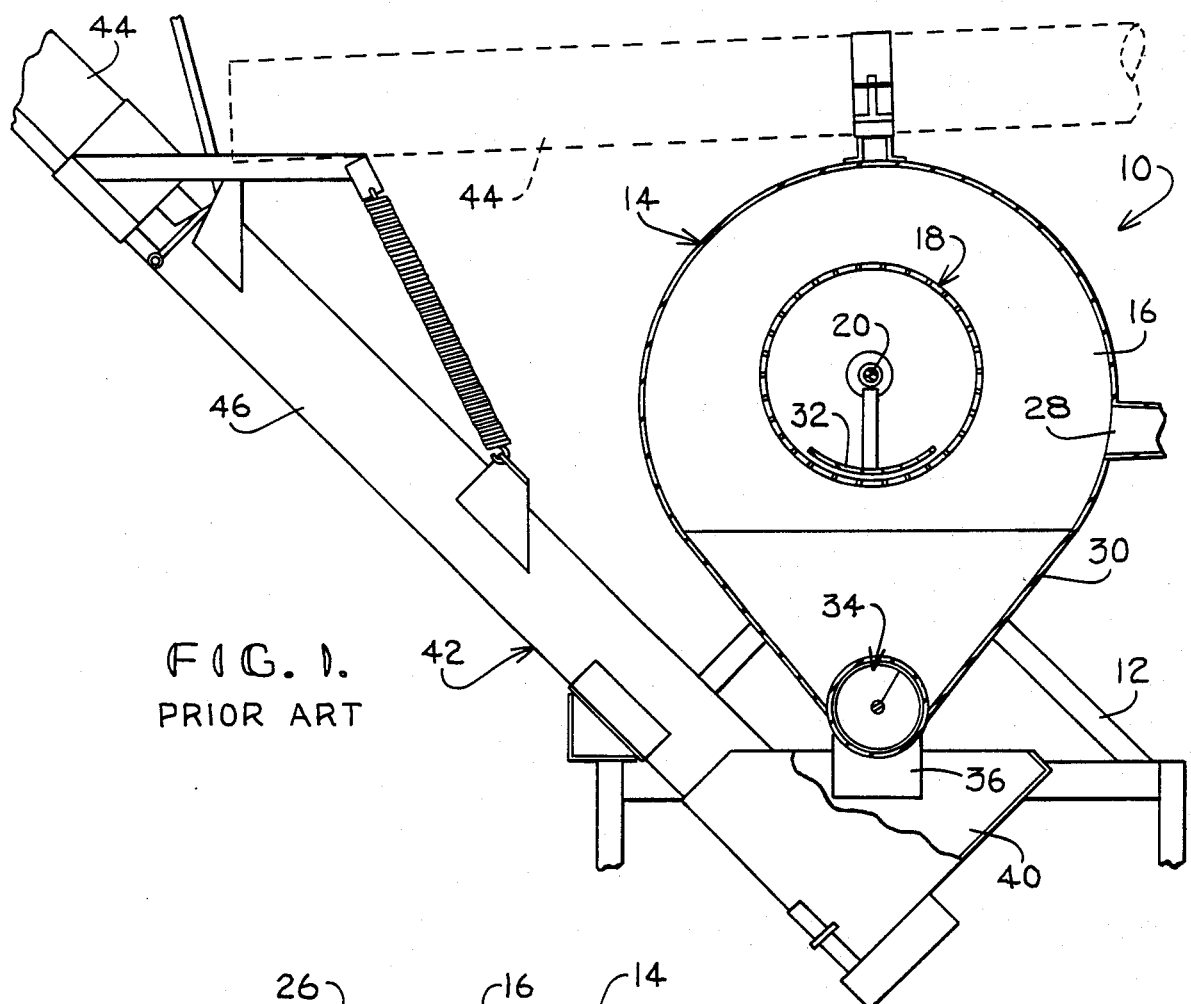
FIG. 1 is a fragmentary, end elevational view of a prior art machine representing a commercialized form of the machine disclosed in the aforementioned Patent 4,662,800, with portions of the machine being broken away and shown in cross-section to reveal details of construction.
Figure 2:
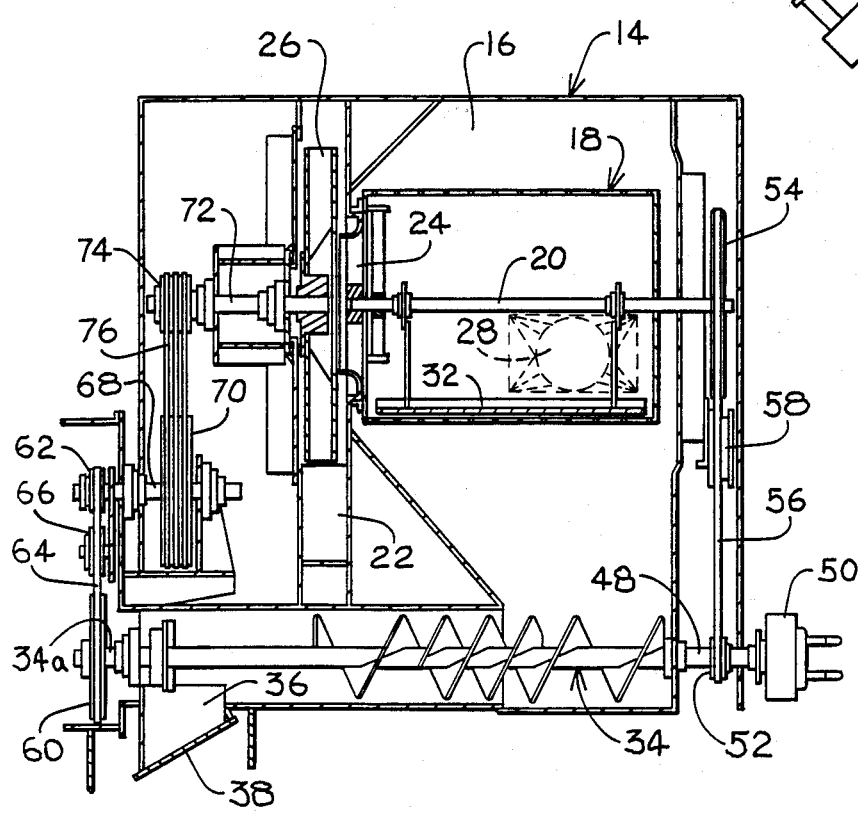
FIG. 2 is a fragmentary, generally vertical cross-sectional view through the prior art machine of FIG. 1 illustrating details of construction.

FIGS. 1 and 2 illustrate portions of a commercialized prior art machine which is a step beyond the machine illustrated in Patent 4,662,800 in the sense that the machine of FIGS. 1 and 2 has an upwardly and outwardly inclined discharge auger forming a permanent and integral part thereof, in contrast to the machine of the '800 Patent wherein it was necessary to position a separate piece of conveying equipment such as an auger assembly under the discharge port of the machine for transferring the discharged materials from that location to an awaiting receptacle. In relevant part, the prior art machine 10 of FIGS. 1 and 2 includes a mobile chassis 12 supporting a hollow body 14 which defines an internal chamber 16. A perforated separating drum 18 is located within the chamber 16 and is supported for rotation about the axis of a fore-and-aft extending drive shaft 20. The rear, open end of the drum 18 communicates with a fan chamber 22 via a relatively large aperture 24 so as to cause negative pressure to be established within the drum 18 and chamber 16 upon rotation of a fan 26 located with in the fan chamber 22. The fan chamber 22 communicates with a suitable exhaust (not shown).

The body 14 has an inlet 28 in a sidewall thereof which is adapted to be connected with an intake hose or conduit in the same manner as that illustrated in Patent 4,662,800 so that granular materials may be sucked up through the hose and passed into the chamber 16 via inlet 28. The drum 18 serves as means for separating the airborne particles from the air itself as the particles gravitate down into the hopper region 30 of the body 14 and the air passes through the perforations in drum 18 and on into the fan housing 22 to be subsequently exhausted. An internal, stationary baffle 32 within the drum 18 and extending along the full length thereof adjacent its lower peripheral portion precludes the intake of air by the perforations at that location so as to encourage any particles adhering to the drum 18 to gravitate therefrom as the perforations pass the baffle 32.

At the bottom of the hopper region 30, a consolidating auger 34 extends fore-and-aft of the machine 10 for transferring collected materials rearwardly from the body 14 to a rearmost, downwardly projecting discharge port 36. A spring-biased door 38 yieldably seats against discharge port 36 so as to provide an air lock against the entry of ambient air when material is not issuing from port 36.

As illustrated in FIG. 1, the discharge port 36 empties into a collector 40 which delivers the discharged material down into an elevating auger assembly 42 which is supported by the chassis 12 for movement with the rest of the machine 10 during transport between loading operations. The auger assembly 42 is inclined upwardly and outwardly away from the body 14 and includes upper and lower hingedly-interconnected sections 44 and 46 respectively, the upper section 44 being swingable into a transport position overlying and supported by the body 14 as illustrated in phantom in FIG. 1.

Referring to FIG. 2, it will be seen that power for operating the various components of the machine 10 is supplied via an input shaft 48 adapted at its forward end to be operably coupled with the power output shaft (not shown) of a typical farm tractor. A slip clutch 50 is provided in association with the input shaft 48 to prevent damage in the event of overloading of the rotary components of machine 10.

A relatively small diameter sheave 52 on input shaft 48 is drivingly coupled with a large sheave 54 on shaft 20 via an endless belt 56 tensioned by a tensioning device 58, thus rotating the drum 18. The shaft 20 does not pass into the fan housing 22 to drive the fan 26, such driving power being provided by other means described hereinafter.

In this regard, the auger 34, which is driven directly by the input drive shaft 48 as a rearward extension thereof, has a rear shaft extension 34a that passes outwardly beyond the discharge port 36 and carries a sheave 60. The sheave 60 in turn drives an upwardly disposed, smaller sheave 62 by an endless belt 64 which is tensioned by a tensioning sheave 66. The upper sheave 62 is fixed to a jackshaft 68 carrying a large triple sheave 70 internally of the machine which in turn supplies driving power to the upwardly disposed fan shaft 72 via a smaller triple sheave 74 on fan shaft 72 and an endless triple belt 76. The elevating auger 42 is driven by mechanism not shown operably coupled with the shaft extension 34a of the consolidating auger 34.

All of the foregoing description relates to a prior art machine commercialized by the assignee of the present invention and over which the present invention is a significant improvement. Notwithstanding the improved nature of the machine about to be described in detail, it will be noted that the two machines have certain features in common and, for the sake of convenience, reference will be made from time-to-time the disclosure of the prior art machine in FIGS. 1 and 2 for a full and complete understanding of the machine of the present invention. Likewise, if necessary or desirable, reference may be had to the prior art machine disclosed in Patent 4,662,800 for a full and complete understanding of the present invention.

FIGS. 3–7 relate to a loader 78 which incorporates the principles of the present invention. As illustrated, loader 78 includes a wheeled chassis 80 having a forwardly extending tongue 82 by which the loader 78 may be coupled with a towing vehicle (not shown). Supported on the chassis 80 is a hollow body 84 partitioned internally to define an air-materials separating chamber 86, a fan chamber 88, and a drive mechanism chamber 90 for housing certain of the various drives of the machine. Body 84 is generally cylindrical about a fore-and-aft axis, having a generally semicircular upper wall 92 and a pair of downwardly and centrally converging, inclined sidewalls 94 and 96. The body 84 is also provided with an upright front wall 98 and with a similarly upright rear wall 100, both of which span the distance between opposite sidewalls 94,96 and the top wall 92. Internal, transversely disposed partitions 102, 104, and 106 function to subdivide the interior of the body 84 into the separating chamber 86, the fan chamber 88, and the drive mechanism chamber 90. Separating chamber 86 is also provided with front and rear slope sheets 108 and 110, respectively, which are inclined downwardly and inwardly, converging toward one another as the bottom of the body 84 is approached. A relatively short, downwardly inclined slope sheet 112 is provided in the bottom of the separating chamber 86 between front and rear sheets 108,110 and beside sidewall 94.

An inlet 114 is located in sidewall 94 generally adjacent the front end of the separating chamber 86 and is presented by the open innermost end of a laterally outwardly extending hollow member 116 which is transformed from a generally rectangular configuration adjacent the sidewall 94 to a generally circular cross-section at its outermost end. At such outermost end, a conduit or hose 118 is fixedly attached thereto in direct communication with the inlet 114 and is provided with a pickup nozzle 120 at its outer end for receiving grain or other particulate materials to be handled by the loader machine 78.

In the opposite sidewall 96 and disposed in fore-and-aft alignment with the inlet 114 is an outlet 122 having a elongated, rectangular configuration, as perhaps shown best in FIG. 4, and extending upwardly along the sidewall 96 from the floor 112. A formed metal housing of elongated, trough-like configuration 124 is affixed to the sidewall 96 outboard of the outlet 122 and in convering relationship therewith so as to house the lower length of an elevating or discharging auger broadly denoted by the numeral 126 which extends generally upwardly and outwardly at an incline from a point just below the floor 112 to a remote outermost end spaced upwardly and outwardly above and away from the body 84. The inboard side edges of the trough-like housing 124 coincide with the fore-and-aft extremities of the outlet 122.

Also disposed within the separating chamber 86 is a separating drum 128 of perforated nature of generally the same type of construction and operation as the separating drum 18 in FIGS. 1 and 2. The drum 128 is affixed to a fore-and-aft extending shaft 130 about whose axis the drum 128 is rotated in a counterclockwise direction, viewing FIG. 5, during operation. An aperture 132 in partition 104 corresponds to aperture 24 in the machine of FIGS. 1 and 2 for the purpose of communicating the interior of drum 128 with the fan chamber 88 via the proximal open end of the drum. Thus, the fan 133 in chamber 88 corresponding to the fan 26 in the machine of FIGS. 1 and 2 is operable to draw a negative pressure within the drum 128 and the separating chamber 86 to induce a powerful current of air to enter the nozzle 120 of hose 118 and flow into the separating chamber 126. The fan chamber 88 exhausts its air to an upstanding muffled exhaust 134 supported by the chassis exteriorly of the body 84. An internal, stationary baffle 136 within the drum 128 functions in a manner similar to the baffle 32 in the machine of FIGS. 1 and 2 to block the ingress of air into the drum 128 in the lower peripheral portion thereof such that any light, adhering particles on the drum surface will drop therefrom as the periphery of the drum passes around the baffle 136.

It will be noted that the inlet 114 is located substantially below the axis of rotation of the drum 128 defined by the shaft 130 and, likewise, the outlet 122 is located far below the shaft 130. In fact, the upper extremities of both the inlet 114 and the outlet 122 are disposed at approximately the same level as the lowermost periphery of the drum 128 so that the entireties of the inlet 114 and the outlet 122 are below drum 128 and directly across from one another.

The auger 126 and the housing 124 form portions of what may be more broadly termed an auger assembly 138 which further includes an elongated tubular housing 140 leading upwardly and outwardly away from the lowermost, channel-shaped housing 124 in open communication therewith. The auger 126 is supported in coaxial relationship with the tubular housing 140 interiorly of the latter for moving particles received by the inlet 122 upwardly and outwardly away from the body 84 to an awaiting truck or other receptacle. It will be noted that the housing 140 is hinged at 142 to enable an upper section 140a of tubular housing 140 to be folded back into overlapping relationship with the body 84 for roading purposes. Of course, the auger 126 is likewise constructed in sections so the entire auger assembly 138 is hingable at 142 for alternative disposition in either the phantom line transport condition of FIG. 5 or the full line working conditon of FIGS. 3 and 5.

Figures 6, 7:
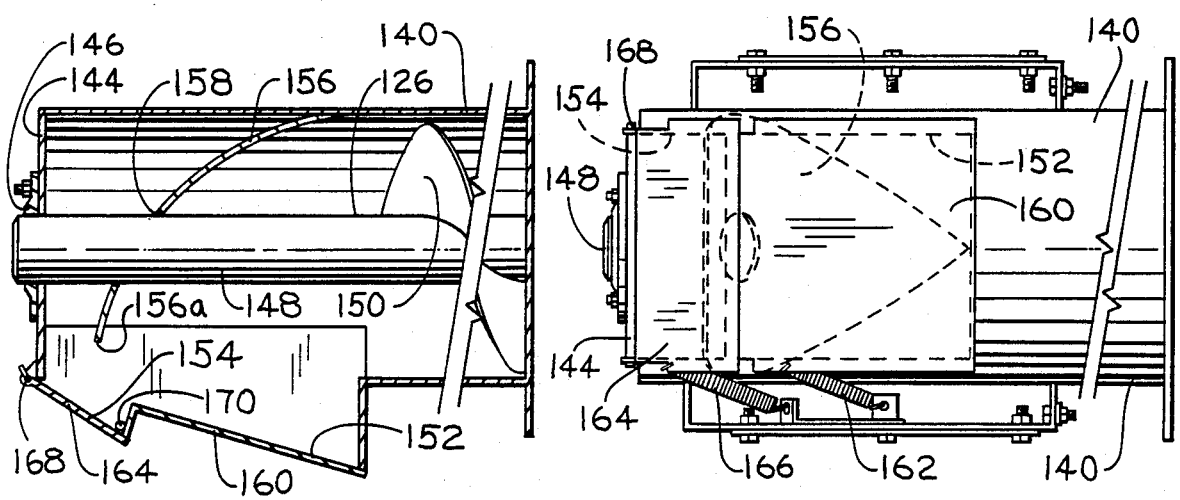
FIG. 6 is an enlarged, fragmentary, longitudinal cross-sectional view of the discharge end of the auger assembly revealing internal details of construction.
FIG. 7 is a bottom plan view of the discharge end of the auger assembly of FIG. 6.

As illustrated in detail in FIGS. 6 and 7, the auger housing 140 is provided with an outer end plate 144 serving to close off the outermost end of the auger assembly 138. The end plate 144 carries a bearing 146 that journals the shaft 148 of auger 126. Helical flighting 150 is provided about and along the shaft 148 from the innermost end of the latter adjacent the floor 112 of separating chamber 86 to a point spaced a short distance inwardly from the end plate 144 of auger housing 140.

A pair of successive outlet ports 152 and 154 are located within the normally lower stretch of the auger housing 140 immediately adjacent the end plate 144 for the purpose of allowing the discharge of grain or other materials elevated to that location by the auger 126. The port 152 is of larger size than the port 154 and is closer to the endmost extremity of the auger flighting 150, which terminates immediately adjacent the port 152 in 'upstream' relationship therewith. A curved deflector 156 within the auger housing 140 between the end of the flighting 150 and the end plate 144 extends generally downwardly from the side of auger housing 140 opposite the ports 152 and 154 and is so disposed that its concave side generazlly faces the port 152 such that materials are encouraged to exit through the port 152 rather than the port 154. It will be noted, however, that the lowermost terminal end 156a of the deflector 156 is spaced a distance above the port 154 so as to provide some room for materials to pass beyond the port 152 and to the port 154 where they may also leave the auger housing 140. A clearance opening 158 in the deflector 156 provides for the extension of auger shaft 148 therethrough completely to the supporting end cap 144, and the opening 158 is sufficiently large as to permit a certain small measure of materials to pass therethrough if need be to reach the smaller outlet port 154. As will be appreciated, the deflector 156 prevents grain and other materials from accumulating in the upper remote corner of the auger housing 140 opposite the outlet ports 152 and 154.

The port 152 is provided with a sealing door 160 that is yieldably biased by a tension spring 162 on the outside of the housing 140 into a closed, sealing position, as illustrated in the various figures. Likewise, the smaller port 154 is provided with a sealing door 164 which is yieldably biased by a tension spring 166 on the outside of the housing 140 into a closed sealing position, as illustrated in the figures. The smaller door 164 swings about a transverse hinge pin 168, while the larger door 160 swings about a transverse hinge pin 170. Although the springs 162 and 166 are sufficiently strong as to normally maintain the doors 160 and 164 closed, the springs 162,166 are still light enough that when material forcibly accumulates in the vicinity of ports 152 and 154 by virtue of the auger 126, such doors 160 and/or 164 may open to the extent necessary to allow the discharge of the granular materials. It will be appreciated in this respect that opening of either of the doors 160,164 is only to that extent necessary to actually discharge the products seeking exit so as to minimize the opportunity for ambient air to be drawn into the auger assembly 138 at that location.

Although the drives for the drum 128, the fan 133 and the auger 126 have not been described in detail hereinabove, suffice it to point out that such drives may be similar in most respects to the drives illustrated in FIG. 2 with respect to the prior commercialized machine. However, inasmuch as the machine 78 has no full length, consolidating floor auger, such as the auger 34 in FIGS. 1 and 2, power from the front of the machine is delivered to the rear merely via a simple drive shaft such as the drive shaft 172 illustrated in cross-section in Fig. 5. Such shaft 172 may then provide power for the fan 133 within chamber 88 in substantially the same manner as that provided with respect to the prior art machine of FIGS. 1 and 2. Also of some difference is the manner in which driving power is supplied to the auger assembly 138, which, as illustrated only broadly in FIG. 3, can be obtained via obliquely disposed belt and pulley mechanisms 174 which are operably coupled with a sheave 176 on the innermost end of auger shaft 148, as illustrated in FIG. 5.

OPERATION

When the loader 78 is towed to the desired work site and the auger assembly 138 has been unfolded and the hose 118 properly installed on member 116, of a drive shaft 178 coupled with the power takeoff shaft (not shown) of the tractor will activate the fan 133, the drum 128, and the auger 126. Accordingly, a powerful current of air will be drawn into the open end of the nozzle 120 by the negative pressure condition created by the suction fan 133. Such flow enters the inlet 114, passes through the perforations within the drum 128, moves through aperture 132 to engage the fam 133, whereupon it is ultimately exhausted to the atmosphere through the muffled exhaust structure 134.

Figure 5:
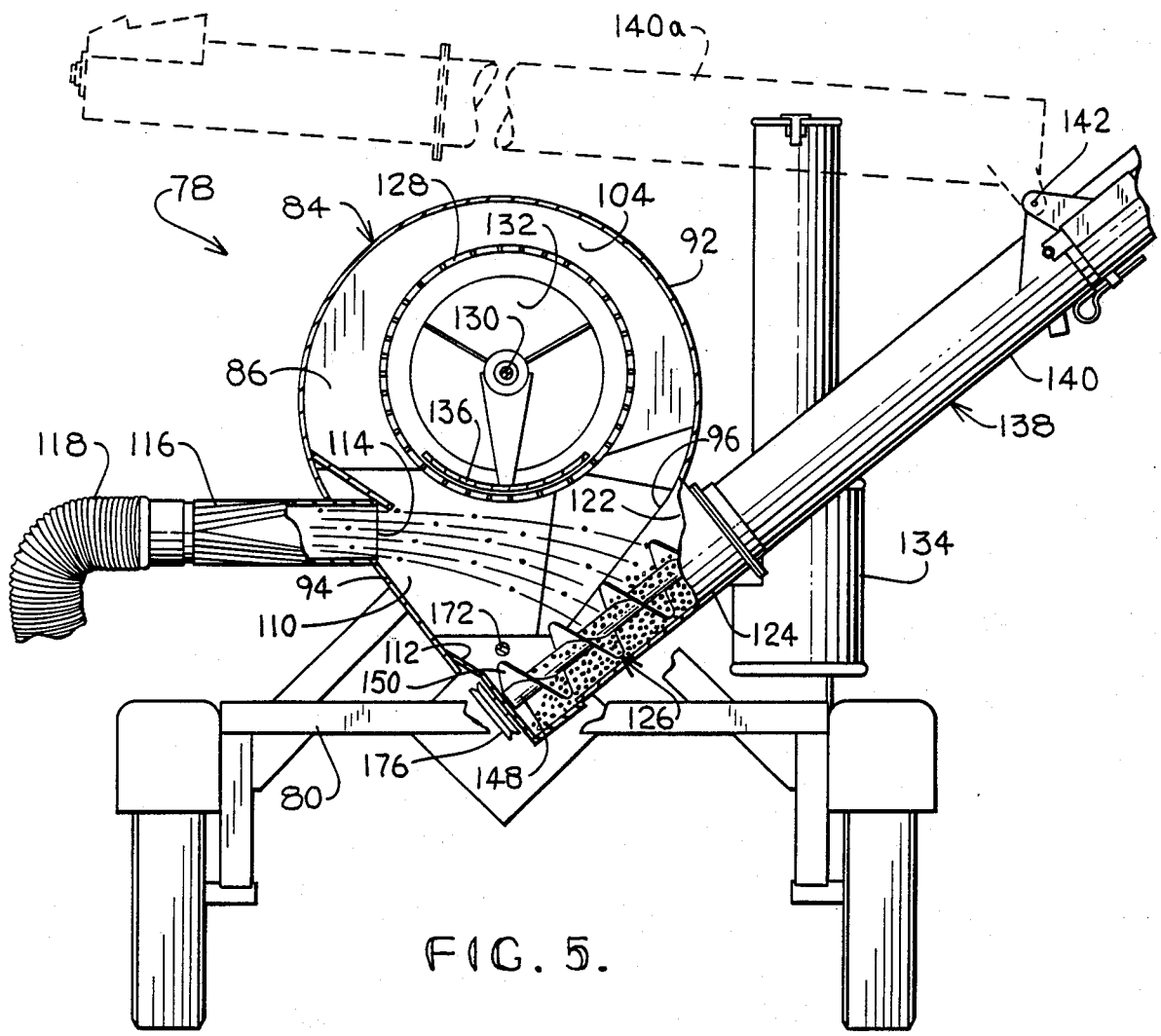
FIG. 5 is an front end elevational view of the machine of FIG. 3 with parts broken away and shown in cross-section to reveal details of construction.

Grain or other particulate materials entrained within the powerful air stream within hose 118 are propelled into the separating chamber 86 and, as illustrated generally in FIG. 5, are caused by their own momentum to fly across the chamber 86 and rush directly into the awaiting inlet 122, somewhat in the nature of a supercharging action. While the air stream which transports the particles through the hose 118 is powerful, the momentum of such particles as they approach the body 84 through the horizontal entry member 116 is such that the particles, for the most part, do not become adhered to the drum 128 but rather are impelled directly into the outlet 122 in the opposite sidewall 96.

The strategic position of the drum 128 relative to the inlet 114 and the outlet 122 is helpful in this respect since the drum 128 is positioned up out of the area of main flow of the particles moving across the chamber 86 to the outlet 122. Although there may be a certain amount of erratic movement of some of the particles and some inclination of the particles to adhere to the drum 128, for the most part they simply charge into the outlet 122 while the air enters the drum 128 and ultimately is exhausted from the machine. Of course, any particles that do become adhered to the drum 128, including not only the grain itself but lighter chaff particles and the like, will drop off as they rotate with the drum past the baffle 136. Moreover, it will be appreciated that the area of the drum 128 most adjacent the incoming stream of particles is closed off by the baffle 136 so there is less tendency for the particles to adhere to the periphery of the drum 128 than might otherwise be the case. Although the machine will still function satisfactorily if the lower portion of the drum 128 is partly located within the path of travel of incoming granular materials from the inlet 114, best and most efficient results have been obtained when the drum 128 is fully up out of the material flow as illustrated in FIG. 5.

The auger assembly 138 continuously advances the materials received by inlet 122 upwardly and outwardly away from the body 84 toward the outermost end of assembly 138. As the augered materials approach the end of the auger housing 140, they encounter the down-turned deflector 156 and are encouraged to press against and open the air lock door 160 and gravitate through port 152. If the volume of materials at any point in time is great enough, the second door 164 will also be forced partially open to permit the additional needed discharge capacity. Opening of both of the doors 160,164 and discharge through both of the ports 152,14 is most likely to occur when large scale movements of grain or other materials is occurring, such as, for example, when the contents of a grain bin are being unloaded and transferred. However, at or near the end of such unloading procedure, when the nozzle 120 is moved around by the operator to sweep up remnants of grain, it is likely that only the first door 160 will be opened due to the relatively small volume of grain moving through the auger housing 140 at that time.

It is during the movement of relatively small volumes of materials through the auger assembly 138 that the double door arrangement with the two outlet ports 152,154 and their respective doors 160,164 becomes particularly important. Although a single large outlet port corresponding to the combined dimensions of the ports 152,154 could be utilized and, correspondingly, a single large sealing door corresponding to the collective dimensions of the doors 160,164 could be provided, such an arrangement would tend to allow the undesired ingress of ambient air during such time that the large door was opened for only small volume discharge. In other words, there is more opportunity in that type of a single large door arrangement for the ambient air to be drawn into the port around the sides of the door which may not be entirely blocked by outflowing grain or other particles, and this has a significant power-robbing effect on the system, since the suction of the nozzle 122 may be correspondingly reduced. This, in turn, causes the fan of the machine to work that much harder in order to produce the same amount of suction, thereby decreasing the efficiency of the machine and promoting untoward and premature wear of the fan and its associated components.

With the double door air lock arrangement of the present invention, however, the outlet space represented by the port 154 is never opened unless it is actually needed. Thus, less opportunity is afforded for ambient air to enter the auger assembly 138 via the discharge port means than might otherwise be the case, increasing the overall efficiency and effectiveness of the machine.

It should be apparent from the foregoing that the loader of the present invention may be utilized to perform a number of different jobs where efficient bulk loading and transfer of particulate materials is desired. Because of the direct charging action of the particulate materials into the lower end of the auger assembly 138 and the elimination of the previously utilized consolidating floor auger, the overall efficiency of the loader of the present invention is significantly greater than that available in the previously commercialized machine of FIGS. 1 and 2 and the machine in Patent 4,662,800. Not only is there less mechanism to be driven, but the direct charging concepts mean that materials will not accumulate and build up within the lower regions of the separating chamber 86 to bear against the rotating drum 128 and inhibit its free rotation. This removal of drag on the drum 128 also produces increased operating efficiencies.

It has also been found that the direct charging concepts of the present invention additionally provide for increased operating capacity. In other words, a greater volume of materials per unit time can be moved through the machine of the present invention than in prior loaders employing a vacuum pickup coupled with an auger discharge mechanism. The machine thus becomes particularly attractive as a less complicated, lower cost alternative to other types of fully pneumatic loaders employing not only vacuum pickup but positive pressure pneumatic discharge as well.

It will be apparent to those skilled in the art that various modifications of the invention might obviously be made in the disclosed preferred embodiment. Thus, the present invention is not limited to the preferred body only, but rather, includes those modifications and variations within the scope and spirit of the appended claims.

We claim:

1. A high-efficiency, pneumatic bulk loader for granular materials comprising:
   a mobile chassis adapted to be positioned adjacent materials to be loaded;
   a hollow body mounted on said chassis and defining an internal, air-materials separating chamber,
   said body including a pair of oppositely disposed, generally upwardly projecting sidewalls presenting opposed extremities of said chamber;
   an inlet in one of said sidewalls;
   a pickup conduit coupled with said inlet through which materials may be directed into the chamber;
   suction mechanism carried by the chassis and communicating with said chamber for drawing an air stream through the conduit to entrain the materials and propel them into the chamber through the inlet;
   an outlet in the other sidewall of the body opposite said inlet;
   means within said separating chamber for allowing the air stream to escape from the chamber while the momemtum of the materials carries the same across the width of the chamer and charges them into said outlet;
   a discharge conveyor operably coupled with said outlet for transferring materials charged into the outlet to a remote location; and
   means for sealing said discharge conveyor against the substantial entry of ambient air during operation of the discharge conveyor and said suction mechanism whereby to prevent significant diminution of the strength of the air stream created by said mechanism.

2. A high-efficiency bulk loader as claimed in claim 1, said discharge conveyor comprising an upwardly and outwardly inclined auger assembly including an elongated, tubular housing and an internal auger rotatable about the longitudinal axis of said housing in a direction to move the charged materials upwardly and outwardly away from the body, said sealing means including an annular wall of said housing in circumscribing relationship with said auger.

3. A high-efficiency bulk loader as claimed in claim 2, said body having a lower extremity with said sidewalls converging downwardly and inwardly as said extremity is approached, said outlet commencing at a point spaced above said extremity and extending downwardly to the extremity.

4. A high-efficiency bulk loader as claimed in claim 3, said housing of the auger assembly being open along the full length of said outlet to expose a corresponding longitudinal portion of the auger.

5. A high-efficiency bulk loader as claimed in claim 1, said separating means including a foraminous drum rotatable about a horizontal axis and disposed within the path of travel of the air stream escaping from the body, said separating means further including a stationary baffle adjacent the periphery of said drum to block the ingress of air into the drum in the vicinity of said baffle whereby to encourage adhered particles to gravitationally drop from the drum as the drum periphery passes said baffle.

6. A high-efficiency bulk loader as claimed in claim 5, said axis of rotation of the drum being disposed in transverse relationship to the path of travel of the air stream as it enters the chamber from the inlet.

7. A high-efficiency bulk loader as claimed in claim 5, said inlet and said outlet being disposed below the axis of rotation of said drum.

8. A high-efficiency bulk loader as claimed in claim 7, said axis of rotation of the drum being disposed in transverse relatinship to the path of travel of the air stream as it enters the chamber from the inlet, said drum being rotated in such a direction that its lower periphery moves generally from the inlet toward the outlet.

9. A high-efficiency bulk loader as claimed in claim 8, said inlet and said outlet being positioned below the lower periphery of said drum.

10. A high-efficiency bulk loader as claimed in claim 9, said discharge conveyor comprising an upwardly and outwardly inclined auger assembly including an elongated, tubular housing and an internal auger rotatable about the longitudinal axis of said housing in a direction to move the charged materials upwardly and outwardly away from the body, said sealing means including an annular wall of said housing in circumscribing relationship with said auger.

11. A high-efficiency bulk loader as claimed in claim 10, said body having a lower extremity with said sidewalls converging downwardly and inwardly as said extremity is approached, said outlet commencing downwardly to the extremity.

12. A high-efficiency bulk loader as claimed in claim 11, said housing of the auger assembly being open along the full length of said outlet to expose a corresponding longitudinal portion of the auger.

13. A high-efficiency bulk loader as claimed in claim 2, said annular wall of the housing including outlet port means adjacent an outer end of the auger assembly disposed for gravitationally discharging materials delivered to the port means by said auger, said sealing means further including door means yieldably biased into a position sealably closing said port means when materials are not present at the port means to be discharged, said door means being forcibly openable by the presence of materials at said port means to the extent necessary to permit discharge of the materials.

14. A high-efficiency bulk loader as claimed in claim 13, said port means including a pair of axially adjacent ports along the length of said sidewall and said door means including a separate door for each of said ports respectively.

15. A high-efficiency bulk loader as claimed in claim 14, said auger housing including an internal deflector located above said ports with respect to the normal disposition of said auger assembly during operation and positioned to direct materials away from the end of the housing and into said ports.

16. A high-efficiency bulk loader as claimed in claim 15, said auger having a central shaft and a continuous length of helical flighting wrapped about said shaft, said flighting of the auger terminating short of said ports and said shaft extending beyond said flighting into overlying relationship with the ports, said deflector having a clearance opening permitting passage therethrough of said shaft.

17. A high-efficiency bulk loader as claimed in claim 16, said deflector being generally arcuately concavo-convex with its concave side facing said ports.

* * * * *